United States Patent [19]

Jackson et al.

[11] Patent Number: 4,999,915

[45] Date of Patent: Mar. 19, 1991

[54] SAWS AND SAW TEETH AND BLADES THEREFOR

[75] Inventors: Brian K. Jackson, Newton Aycliffe, England; Horst Grossmann, Hunfelden, Fed. Rep. of Germany

[73] Assignee: Black & Decker Inc., Newark, Del.

[21] Appl. No.: 412,762

[22] Filed: Sep. 25, 1989

[30] Foreign Application Priority Data

Sep. 27, 1988 [GB] United Kingdom ............... 8822627

[51] Int. Cl.$^5$ .................. B23D 49/00; B27B 33/02
[52] U.S. Cl. ........................................ 30/369; 83/852
[58] Field of Search ................. 83/839–844, 83/851, 852, 853; 30/369, 355, 392, 277.4

[56] References Cited

U.S. PATENT DOCUMENTS

| 4,640,172 | 2/1987 | Killmann et al. | 83/851 |
| 4,690,024 | 9/1987 | Chaconas | 83/852 |
| 4,798,001 | 1/1989 | Grossmann et al. | 30/355 |

FOREIGN PATENT DOCUMENTS 0267311  5/1988  European Pat. Off. .

Primary Examiner—Douglas D. Watts
Attorney, Agent, or Firm—Dennis A. Dearing; Charles E. Yocum; Edward D. C. Bartlett

[57] ABSTRACT

A saw blade comprises a support member having at least one edge, and, spaced along that edge, a series of slots in each of which is secured a saw tooth and in which a portion of the tooth is located within the slot and a further portion extends beyond the slot to overlie a portion of a surface of the support member.

Part of the slot and a part of the tooth may be sector-shaped, each slot may include an entry portion with side edges and a base edge or edges, and the tip of the sector-shaped part is located centrally of the base edge, the sector-shaped part communicating with the entry portion via an opening in the base edge whose sides are rounded and which are a tight fit with a mating portion of a tooth, the remainder of a tooth fitting into the slot with some clearance.

The invention also extends to a tooth for the saw blade, the tooth having a cutting portion and a body portion to locate in said slot.

According to a further aspect of the invention, a cutting blade has hardened cutting teeth located in the slot in the blade, there being a support edge or edges spaced from the cutting edge of the blade and substantially parallel thereto which engages a support surface on a guide for the blade.

The support edge(s) may be provided by a strip fixed to the blade or by edges on the teeth remote from their cutting portion which project beyond the surface of the blade.

26 Claims, 4 Drawing Sheets

SAWS AND SAW TEETH AND BLADES THEREFOR

FIELD OF THE INVENTION

This invention relates to saws and teeth and blades therefor and has particular application to saw blades for power saws, for example circular saws, bandsaws, jig saws, sabre saws and saws with a linearly reciprocatable blade or linearly reciprocatable blades. The saws may be hand-held or bench mounted or they may be purpose built structures. The invention is also applicable to manually operated saws, for example tenon saws and bow saws.

BACKGROUND OF THE INVENTION

Conventionally, such saws employ steel blades formed with integral teeth which are ground and set according to particular requirements. Such blades require sharpening from time to time and are not suitable for some manufactured materials of which chip-board is an example.

It has been proposed to use teeth of a hard material, for example tungsten carbide, mounted on a circular blade carrier but the mounting techniques employed do not provide a sufficient degree of security for other forms of carrier, particularly those where linear reciprocation is required. Furthermore, it is known to mount teeth in circular saw blades by use of a keyway. Different styles of keyway are disclosed in GB-A-275554, GB-A-1464640, US-A-3945289 and EP-A-0117991. Another style of keyway for a reciprocatable blade is disclosed in GB-A-665433. However, in all these known constructions, it is a difficult task to hold the teeth in position during manufacture of the blades.

Moreover, some of the tooth configurations previously adopted have been such that tooth production by powder moulding and sintering techniques has been difficult because of abrupt and large changes in the cross-sectional area of the tooth.

SUMMARY OF THE INVENTION

It is an object of the present invention to provide a construction which simplifies manufacture.

The present invention provides tooth configurations which have a mainly uniform thickness, and hence a generally uniform cross-sectional area, and this has the advantage that the teeth themselves can provide bearing surfaces on the blade(s) during use of the saw.

According to one aspect of the present invention, a saw blade comprises a support member, such as a disc or strip, having at least one edge, and, spaced along that edge, a series of slots in each of which is secured a saw tooth, and in which each slot is contoured to provide an edge or edges to support a mating edge or edges on the tooth and wherein a portion of the tooth extends at least partially into the slot, with a further portion extending beyond the slot and overlying a portion of a surface of the support member.

Preferably, the tooth portion is thicker than the support member, so that a portion of the tooth extends beyond the said surface of the support member to provide a bearing edge.

That part of each slot that accommodates said portion of the tooth may be generally sector-shaped, the curved part of the sector adjoining the bearing edge.

Each slot may include an entry portion with side edges and a base edge or edges.

The tip of the sector-shaped part opposite its curved part is preferably located centrally of the base edge and the sector-shaped part is also symmetrically disposed with respect to the longitudinal axis of the slot. Each part of the base edge and its adjacent side wall of the sector-shaped part define two sides of a generally triangular shaped portion, the two triangular shaped portions being the portions of the support member which are overlaid by two further portions of their respective tooth.

The sector-shaped part may communicate with the entry portion via an opening in the base edge whose sides are rounded and which are a tight fit with a mating portion of a tooth, the remainder of a tooth fitting into the slot with some clearance.

The invention also comprises a tooth for a saw blade, the tooth having a cutting portion, and a body portion contoured to provide a platform located centrally of the longitudinal axis of the tooth and for location in a slot in the saw blade, and support shoulders lying transversely of that axis, and extending beyond a portion of the platform, and for overlying the surface portions of the blade.

The platform may be sector-shaped when seen in plan with its apex pointing towards the cutting tip.

The cutting portion may be in the form of a pointed cutting tip which may be bevelled. The tip itself may have an outward set.

The body portion of the tooth may have a surface that is substantially planar, and the support shoulders may be substantially triangular and thinner than the body portion.

The invention also extends to a blade or strip for supporting teeth as described above.

According to a further aspect of the present invention, we provide a cutting tool having a cutting blade carrying cutting teeth formed of a hard material and located in an edge of the blade in suitable slots or the like, the cutting tool including a support member relative to which the blade moves during operation of the tool, there being a support surface or surfaces on the support member with which a support edge or edges on the blade engages or engage during operation of the tool, the support surface or surfaces being parallel to the cutting edge of the blade.

The support edge or edges may be a bearing element(s) connected to an outer face or faces of the blade.

Preferably, the support edges are provided by edges of the teeth of the blade remote from their cutting edges.

Preferably, each tooth has a generally sector-shaped body portion located in a sector-shaped slot in its blade, and a part of the curved edge of the sector-shaped body portion provides said support edge.

Preferably, the tool has two contra-reciprocating cutting blades, each provided with a support edge or edges on its outer face.

BRIEF DESCRIPTION OF THE DRAWINGS

The various aspects of the present invention are now described by way of example only, with reference to the accompanying drawings of which.

DETAILED DESCRIPTION OF THE PREFERRED EMBODIMENTS

The saw blades now to be described are for use in a hand held power saw whose construction is described in detail in European Patent Application No. 0 267 3 (86.115651.1) [whose contents are hereinto incorporated by reference] instead of the blade described therein.

That power saw employs two saw blades arranged in side-by-side contact and reciprocable in opposite directions by an electrically powered drive mechanism.

Figure 1:
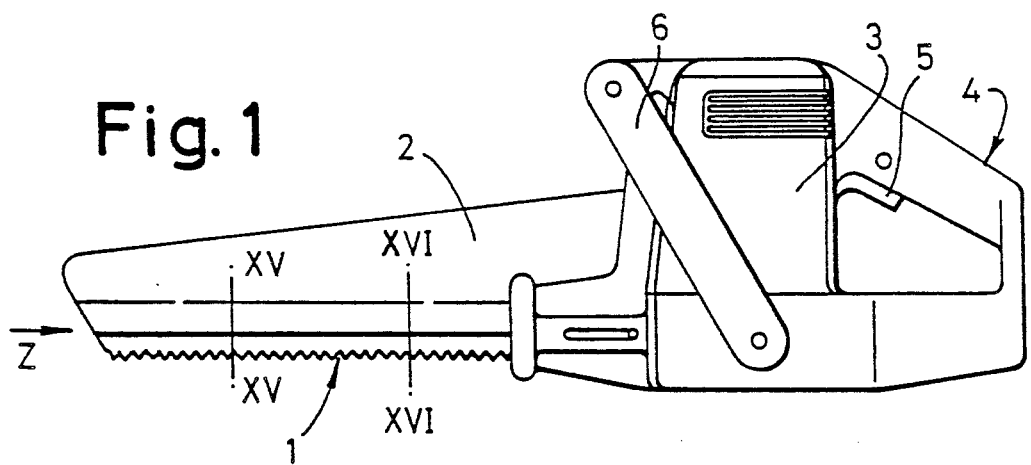
FIG. 1 is a side view of a hand-held, power saw incorporating saw blades embodying the invention.

In FIG. 1, the saw blades are shown diagrammatically at 1 and are guided for reciprocating movement in a slot formed in the lower edge of a support 2 whose top-to-bottom dimension (as seen in FIG. 1) increases towards the housing 3 of the saw. The saw blades 1 extend into the housing where their ends are connected to a drive mechanism within the housing 3 and powered by an electric drive motor also located in housing 3.

Figure 15:
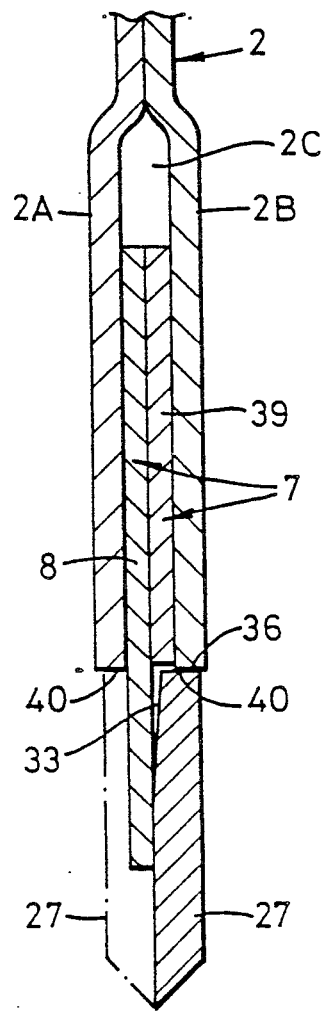
FIG. 15 is a section on an enlarged scale on the line XV—XV of FIG. 1.
Figure 16:
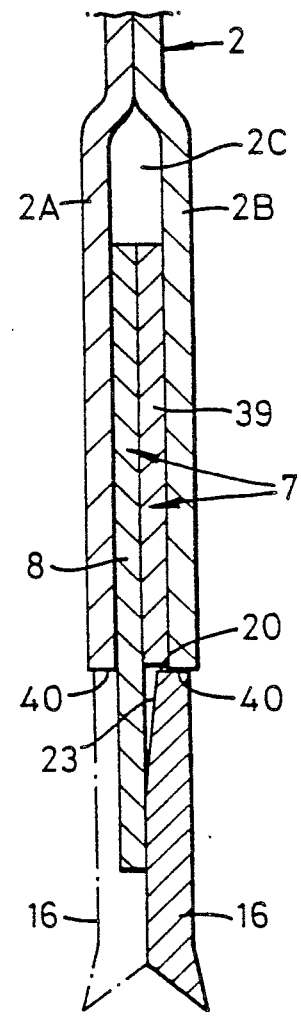
FIG. 16 is a section on an enlarged scale on the line XVI—XVI of FIG. 1.

As can be seen from FIGS. 15 and 16, the support 2 comprises two side-by-side plates 2A, 2B whose lower (as seen in FIG. 1) surfaces are spaced apart to provide a longitudinal slot 2C in which the saw blades slide. The upper parts of the plates 2A, 2B are in contact and are secured together in any suitable manner, for example, by spot welding.

The housing is contoured to provide a rear closed-loop handle 4 part of which houses a control switch (not shown) that is actuable by a trigger 5. The switch controls energisation of the electric drive motor.

Mounted upon the forward part of the housing 3 is a front handle 6 that extends away from the housing 3 on both sides of the latter.

Figure 2:
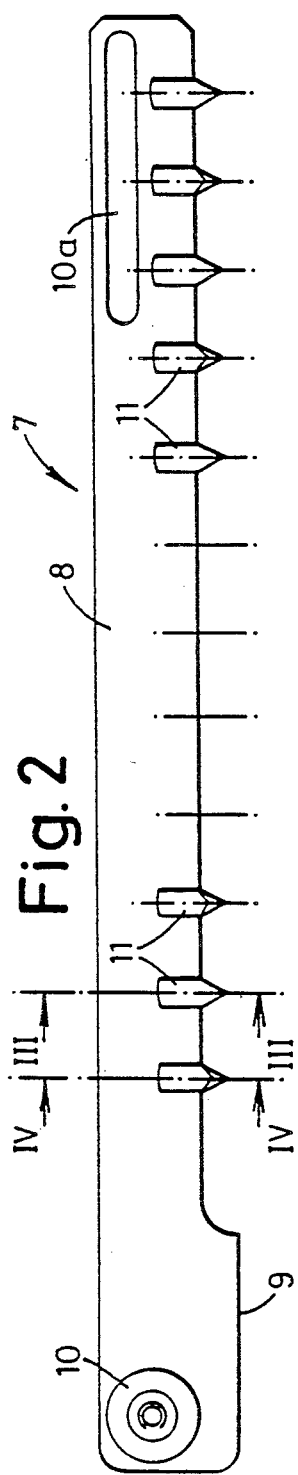
FIG. 2 is a side view of a first saw blade embodying the invention.

The saw blade 7 shown in FIG. 2 is the left-hand of the two blades when viewed in the direction of arrow Z in FIG. 1. The blade 7 comprises a length 8 of steel strip of constant top-to-bottom dimension over most of its length. The top-to-bottom dimension increases over a short length of the strip at the left-hand end thereof (as viewed in FIG. 2) and as indicated at 9. An apertured boss 10 is fixed to the strip 8 close to the left-hand end and is used to connect the blade to the drive mechanism referred to above.

Adjacent to the other end of the strip 8, there is formed a short longitudinal slot 10a whose purpose is described in the application referred to above.

The strip 8 is formed, in a manner described below, to receive cutting teeth 11 at spaced intervals along its length (excluding part 9). In the example shown in FIG. 2, there are twelve teeth, but only eight are shown in detail, the central axes only of the remainder being shown. The tooth pitch is not the same for all teeth, the distance between the fourth and fifth teeth from the left and between the eighth and ninth teeth from the left being slightly greater than the constant distance between the remaining teeth.

The teeth 11 are of tungsten carbide and are fixed to the strip by first placing them in slots 12 cut in the strip and then brazing the teeth in position in the slots. As can be seen from FIG. 5, the slots extend into the strip from the lower (as viewed in FIG. 5) edge of the latter.

Figure 4:
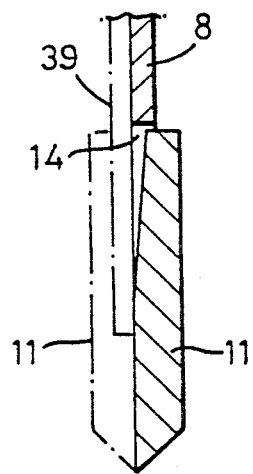
FIG. 4 is a section on line IV—IV of FIG. 2.
Figure 5:
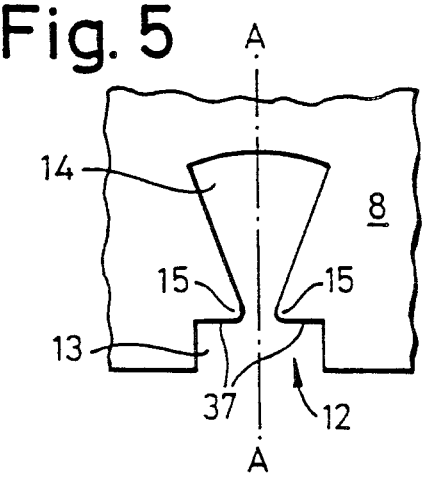
FIG. 5 is a side view, on a larger scale, of a detail of the blade.

The configuration of the slots is shown in FIG. 5. Each slot 12 has a parallel sided entry portion 13 which leads into a sector-shaped extension 14. The entry portion 14 has side edges and a base edge 37 which is generally parallel to the lower edge of the strip 8. The entry portion 13 and the extension 14 lie symmetrically with respect to the longitudinal axis A—A of the slot and the extension 14 joins the entry portion 13 centrally of the base edge of the latter as shown. The junctions between the base and the extension 14 are gently rounded as indicated at 15. As can be inferred from FIGS. 2, 3 and 4, the slots extend for a short distance only into the top-to-bottom dimension of the strip 8.

Alternate teeth along the length of strip 8 are of the configuration shown in FIGS. 7-10 while the remainder are of the configuration shown in FIGS. 11-14. Starting from the right of the strip as seen in FIG. 2, odd numbered teeth are as shown in FIGS. 7-10, and even numbered teeth are shown in FIGS. 11-14.

The tooth shown in FIGS. 7-10 has a pointed portion 16, the side walls of the portion being bevelled in part as indicated at 17. In addition, the extremity of the portion is downwardly-set (as viewed in FIG. 8) as indicated at 18. The set is sufficient to ensure that the kerf cut is of a width that will permit passage of the support 2.

Figure 7:
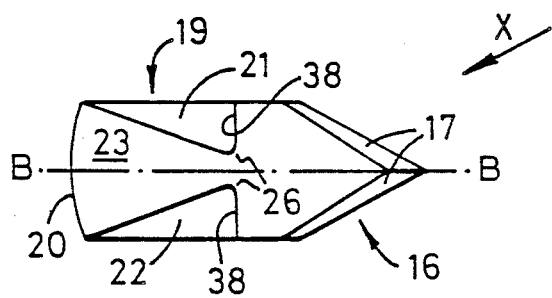
FIG. 7 is a plan view of a first saw tooth embodying the invention.
Figure 10:
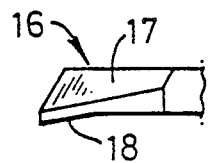
FIG. 10 is a scrap view of the tooth shown in FIG. 7 looking in the direction of arrow X in FIG. 7.
Figure 8:
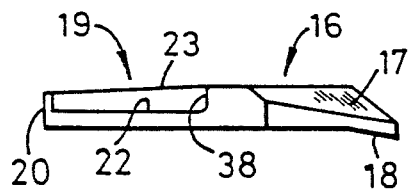
FIGS. 8 and 9 are, respectively, a side and an end view of the saw tooth shown in FIG. 7.
Figure 9:
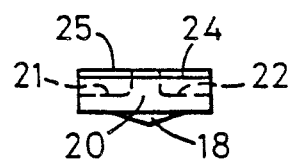
Figure 11:
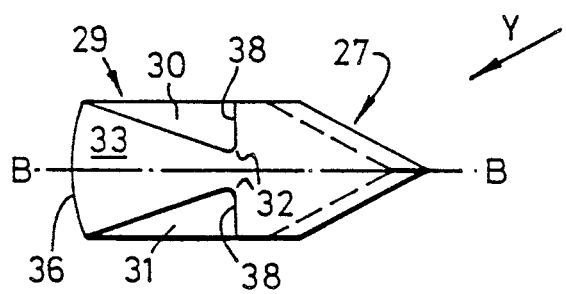
FIG. 11 is a plan view of a second saw tooth embodying the invention.
Figure 14:
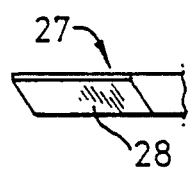
FIG. 14 is scrap view of the tooth shown in FIG. 11 looking in the direction of arrow Y in FIG. 11.

The portion 16 merges into a body portion 19 of generally rectangular form when seen in plan as in FIG. 7 with a curved end face 20. The body portion 19 has equi-sized, triangularly-shaped areas 21, 22 over which the depth of the body portion is reduced by about one half to leave a sector-shaped platform 23 disposed centrally of the longitudinal axis B—B of the tooth and whose upper surface lies in a plane that is inclined slightly to that containing the upper surface of portion 16. This can be observed from FIG. 9 where line 24 represents the upper edge of the left-hand end (as viewed in FIG. 9) of the platform 23 and line 25 represents the edge between the upper surfaces of the platform 23 and portion 16. The areas 21, 22 are so orientated as to leave shoulders 38 which lie transversely of the axis B.

As can be seen from FIG. 7, the adjacent tips of the areas 21, 22 are curved as shown at 26.

Figure 12:
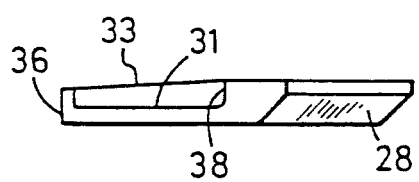
FIGS. 12 and 13 are, respectively, a side and an end view of the saw tooth shown in FIG. 11.
Figure 13:
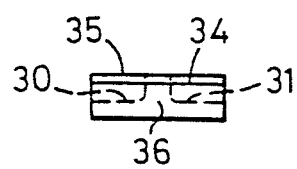

The remaining teeth are of a configuration generally similar to that of the tooth shown in FIGS. 7-10. Thus, as shown in FIGS. 11-14, each remaining tooth has a pointed portion 27 whose edges are bevelled in part as indicated at 28. The extremity of portion 27 is not downwardly set as is the tooth shown in FIGS. 7-10 but is straight as shown in FIG. 12. Those teeth ensure the removal of saw dust from the kerf.

The body portion 29 of the tooth shown in FIGS. 11-14 is identical with that of the tooth shown in FIGS. 7-10, and has equi-sized, reduced-depth triangularly-shaped areas 30, 31 whose adjacent tips are rounded as at 32. The sector-shaped platform 33 that is disposed centrally of the longitudinal axis B—B of the tooth has an upper surface that lies in a plane inclined slightly with respect to that containing the upper surface of portion 27, the inclination being the same as that of the corresponding planes of the tooth shown in FIGS. 7-10. The inclination can be observed from FIG. 13 where lines 34, 35 correspond with lines 24 and 25 of FIG. 9. The body portion 29 also has a curved end face 36, the curvature being identical with that of end face 20. The areas 30, 31 are so orientated as to leave shoulders 38 which lie transversely of the axis B—B.

The teeth are sized so that the platforms 23, 33 will fit into the extensions 14 of the slots in the strip 8. The areas 21, 22 thus overlie surface parts of the plate-like strip 0 on each side of the platforms 23, 33. The surfaces of the platforms 23, 33, when the tooth is correctly positioned, lie flush with the inner surface of the strips 8 or slightly below that surface. The parallel sided entry portions 13 of the slots receive those parts of the teeth between the reduced depth areas and the pointed portions with the base 37 of each entry portion 13 supporting the shoulders 38 of the recessed areas.

The platforms fit tightly in the vicinity of the rounded parts 15 of the slots but elsewhere there are some small clearances to permit the ready flow of brazing alloy during the brazing of the teeth to the strip 8.

Figure 3:
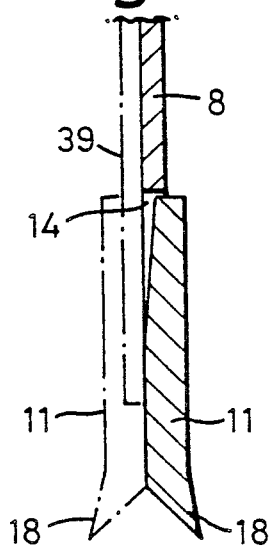
FIG. 3 is a section on line III—III of FIG. 2.
Figure 6:
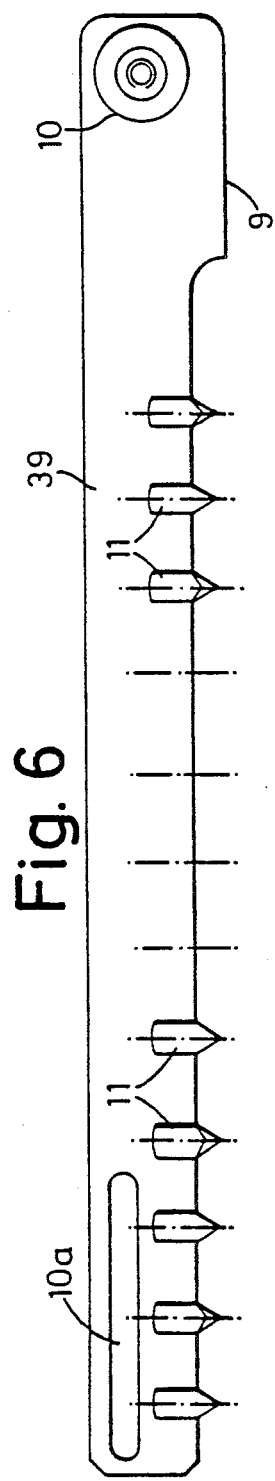
FIG. 6 is a side view of a second saw blade embodying the invention.

The other blade 39 is shown in FIG. 6 and is of a configuration generally similar to that of blade 7 but is its mirror image so that the blades can be placed together in side by side contact as indicated in FIGS. 3 and 4 with the surfaces of the teeth platforms facing each other. The surfaces of the platforms lie flush with or just beneath the respective contacting faces of the saw blades so that side-by-side reciprocating movement of the blade is not impeded and the blades are not separated.

The teeth 11 of blade 39 are located in positions corresponding with those of teeth 11 on blade 7.

The teeth 11 are formed by a process in which tungsten carbide particles are first moulded into the required tooth shape and are then sintered for producing a coherent mass of particles. The tooth configuration described above faciliates the use of moulding techniques and sintering because there are no severe changes in tooth cross section. Moreover, possible distortion during sintering is minimised because the tooth form has one substantially flat or plane surface on which it can rest during sintering.

Once moulded and sintered, the teeth are located in the position with the platforms engaged in the slots. The relatively tight fit between the rounded surfaces 15 and 26 ensures that the teeth are held firmly for subsequent brazing whilst limiting the area of the blade strips over which stressing occurs, because of the tight fit, to a minimum. Subsequently, the teeth are lapped to a required contour.

The slot concept enables the teeth to be accurately positioned on the strip and in particular ensures that the end faces 20 and 36 of teeth on the same strip lie in line and at a constant predetermined distance from the upper (as seen in FIGS. 2 and 6) edge of the strip. The end faces thus form bearing edges which slide along the lower edges of the slot in the support 2.

Figure 17:
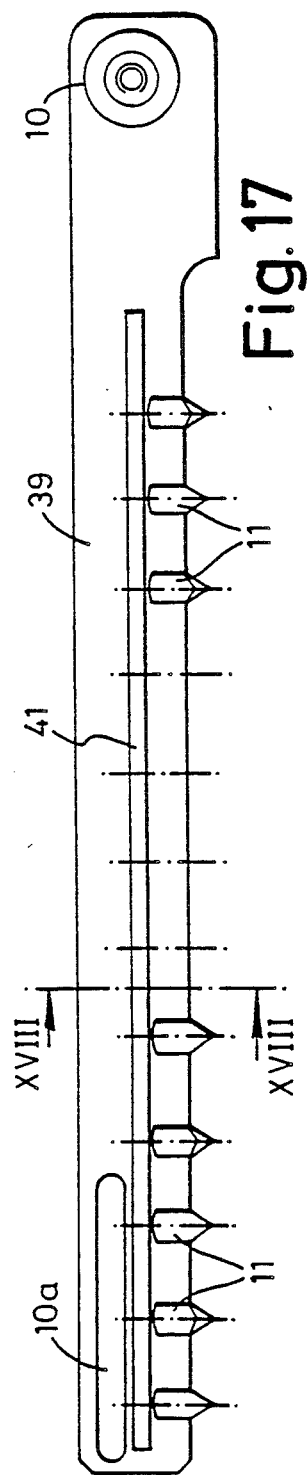
FIG. 17 is a side view of a third saw blade embodying the invention.
Figure 18:
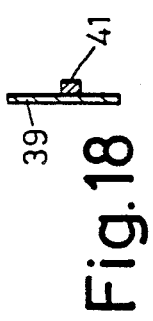
FIG. 18 is a section on the line XVIII—XVIII of FIG. 17.

That feature can be seen clearly in FIGS. 15 and 16 which show that the curved end faces 20 and 36 of the teeth 16 and 27 respectively slide along the lower edges 40 of the plates 2A, 2B. Alternatively, and as shown in FIGS. 17 and 18, each saw blade 7, 39 may have a bearing element 41 secured longitudinally to its outer face. The bearing element 41 may be a steel strip spot welded or secured in some other way to the saw blade. It may be necessary to reduce slightly the overall length of the teeth and of the slots in which they are located to accommodate the bearing element 41.

When blades incorporating the bearing elements 41 are used, the elements 41 contact the lower edges 40 instead of the curved end surfaces of the teeth.

Preferably, at an appropriate stage in their manufacture, the strips are chrome plated to give a hard surface finish. However, of the contacting faces of the blades, only one is chrome plated.

It will be understood that the invention may be embodied in saw blades of forms different from those described above. Thus, circular saw blades may be made with teeth held in slots as may the blades of jig saws and sabre saws, although it will of course be necessary to employ different tooth profiles.

It will also be appreciated that slots of different contours than those described above may be required in other applications. The contour of the slot must provide positive location of the tooth and preferably hold the latter during any subsequent processing for example brazing. In addition, support surfaces must be provided to support the tooth when exposed to loads.

Other tooth profiles may be required in other embodiments of the invention.

It will of course be understood that the present invention has been described above purely by way of example, and modifications of detail can be made within the scope of the invention as defined in the following claims.

We claim:

1. A saw blade, comprising:
   a support member having at least one edge with a series of slots spaced along said edge;
   a saw tooth secured in each of said slots;
   each of said slots being contoured to provide an edge or edges supporting a matching edge or edges on the respective tooth;
   each tooth having a first portion extending at least partially into its respective slot and a further portion extending beyond that respective slot and overlying a portion of a surface of said support member; and
   said tooth first portion being thicker than said support member, so that a portion of said tooth extends beyond said surface of said support member to provide a bearing edge.

2. A saw blade, comprising: a support member having at least one edge, and, spaced along that edge, a series of slots in each of which is secured a saw tooth; and in which each slot is contoured to provide an edge or edges to support a mating edge or edges on the tooth; and wherein a portion of the tooth extends at least partially into the slot, with a further portion extending beyond said slot and overlying a portion of a surface of said support member; and in which said tooth portion is thicker than said support member, so that a portion of said tooth extends beyond said surface of said support member to provide a bearing edge; and in which that part of each said slot that accommodates said portion of the tooth extending thereinto is generally sector-shaped, a curved part of the sector adjoining said bearing edge on said tooth.

3. A saw blade as claimed in claim 2 in which each slot includes an entry portion with side edges and a base edge or edges.

4. A saw blade as claimed in claim 3 in which the tip of the sector-shaped part opposite its curved part is located centrally of said base edge and said sector-shaped part is symmetrically disposed with respect to the longitudinal axis of the slot.

5. A saw blade as claimed in claim 4 wherein each part of said base edge and its adjacent side wall of said sector-shaped part define two sides of a generally triangular shaped portion, said two triangular shaped portions being the portions of said support member which are overlaid by two further portions of their respective teeth.

6. A saw blade as claimed in claim 5 in which said sector-shaped part is in communication with said entry portion via an opening in said base edge whose sides are rounded and which are a tight fit with a mating portion of a tooth, the remainder of a tooth fitting into the slot with some clearance.

7. A tooth for a saw blade comprising a cutting portion and a body portion contoured to provide a platform located centrally of the longitudinal axis of the tooth and for location in a slot in said saw blade, and support shoulders lying transversely of that axis, and extending beyond a portion of said platform, and for overlying surface portions of said blade.

8. A tooth as claimed in claim 7 in which said platform is sector-shaped when seen in plan with its apex pointing towards said cutting tip.

9. A tooth as claimed in claim 8 in which the edges of the cutting tip are bevelled.

10. A tooth as claimed in claim 9 in which the cutting tip has an outward set.

11. A tooth as claimed in claim 7 in which the body portion has a face that is substantially planar.

12. A tooth as claimed in claim 7 wherein said support shoulders are substantially triangular, and thinner than said body portion.

13. A cutting tool, having:
a cutting blade carrying a plurality of separate cutting teeth formed of hard material and located in an edge of said blade in suitable slots;
a support member relative to which said blade moves during operation of the tool; and
a support surface or surfaces on said support member with which a support edge or edges on said blade engages or engage during operating of the tool, said support surface or surfaces being parallel to the cutting edge of said blade.

14. A cutting tool as claimed in claim 13 wherein said support edges are provided by edges of said teeth of the blade remote from their cutting edge.

15. A cutting tool as claimed in claim 13 wherein the or each support edge is provided by a bearing element secured to a face of said blade.

16. A cutting tool according to claim 14 wherein each tooth has a generally sector-shaped body portion located in a sector-shaped slot in its blade, and wherein a part of a curved edge of said sector-shaped body portion provides said support edge.

17. A cutting tool as claimed in claim 13 which has two contra-reciprocating cutting blades, each said blade having a support edge or edges on its outer face.

18. A hand-held power saw having two saw blades as claimed in claim 1.

19. A hand-held power saw, comprising:
first and second saw blades;
each said saw blade comprising a support member having at least one edge, and, spaced along that edge, a series of slots in each of which is secured a saw tooth, and in which each slot is contoured to provide an edge or edges to support a mating edge or edges on the tooth and wherein a portion of the tooth extends at least partially into the slot, with a further portion extending beyond said slot and overlying a portion of a surface of said support member;
said saw blades being guided for longitudinal reciprocation in a support; and
the saw teeth having bearing surfaces which coact with the edge surfaces of said support to support said saw blades.

20. A power saw as claimed in claim 19 in which said bearing surfaces are parts of the portions of the teeth that extend into the slots.

21. A power saw, comprising:
first and second saw blades;
each of said saw blades comprising a support member having at least one edge, and, spaced along that edge, a series of slots in each of which is secured a saw tooth, and in which each slot is contoured to provide an edge or edges to support a mating edge or edges on the tooth and wherein a portion of the tooth extends at least partially into the slot, with a further portion extending beyond said slot and overlying a portion of a surface of said support member;
the saw blades being guided for longitudinal reciprocation in a support; and
each saw blade having an external support member which coacts with said support to support the saw blades.

22. A saw blade, comprising:
a plurality of saw teeth;
a support member having at least one edge, and, spaced along that edge, a series of slots in each of which is secured a respective one of said saw teeth;
each slot being contoured to provide an edge or edges to support a mating edge or edges on the respective tooth; and
each tooth comprising a cutting portion, a body portion contoured to provide a platform located centrally of a longitudinal axis of the tooth and located in a respective one of said slots, and support shoulders lying transversely of that axis and extending beyond a portion of said platform and overlying surface portions of said blade.

23. A saw blade, comprising:
a saw blade member having opposite side faces connected by at least one edge, and spaced apart slots along said edge;
a plurality of saw teeth secured individually in the slots;
each of said saw teeth comprising a cutting portion extending from a body portion;
said body portion having a free standing central platform raised from two areas of reduced thickness one on each side of the central platform; and each said central platform engaging in a respective one of said slots with the two areas of reduced thickness associated with this central platform overlying portions of one of said side faces on opposite sides of the respective slot.

24. The saw blade of claim 23, wherein each saw tooth has two shoulders, one between each of its two areas of reduced thickness and its cutting portion.

25. The saw blade of claim 24, wherein said shoulders extend parallel to said edge.

26. The saw blade of claim 25, wherein said shoulders are with respect to said blade member spaced inwardly of said edge.

* * * * *